United States Patent
Dernoncourt et al.

(10) Patent No.: US 11,941,360 B2
(45) Date of Patent: Mar. 26, 2024

(54) ACRONYM DEFINITION NETWORK

(71) Applicant: ADOBE INC., San Jose, CA (US)

(72) Inventors: Franck Dernoncourt, San Jose, CA (US); Amir Pouran Ben Veyseh, Eugene, OR (US)

(73) Assignee: ADOBE INC., San Jose, CA (US)

( * ) Notice: Subject to any disclaimer, the term of this patent is extended or adjusted under 35 U.S.C. 154(b) by 253 days.

(21) Appl. No.: 17/089,920

(22) Filed: Nov. 5, 2020

(65) Prior Publication Data

US 2022/0138425 A1    May 5, 2022

(51) Int. Cl.
*G06F 40/295* (2020.01)
*G06F 40/274* (2020.01)
*G06N 3/049* (2023.01)

(52) U.S. Cl.
CPC .......... *G06F 40/295* (2020.01); *G06F 40/274* (2020.01); *G06N 3/049* (2013.01)

(58) Field of Classification Search
CPC ...... G06F 40/295; G06F 40/274; G06F 40/30; G06N 3/049
See application file for complete search history.

(56) References Cited

U.S. PATENT DOCUMENTS

| | | | |
|---|---|---|---|
| 2015/0066480 A1* | 3/2015 | Endo | G06F 40/274 704/9 |
| 2018/0285730 A1* | 10/2018 | Zhao | G06N 3/08 |
| 2020/0104360 A1* | 4/2020 | Gahlot | G06F 16/374 |
| 2020/0251100 A1* | 8/2020 | Tan | G06F 40/30 |
| 2021/0034784 A1* | 2/2021 | Baughman | G06F 21/64 |
| 2021/0343410 A1* | 11/2021 | Zhang | G16H 70/60 |
| 2021/0373510 A1* | 12/2021 | Borah | G05B 13/027 |
| 2022/0028367 A1* | 1/2022 | Shekhar | G10L 13/047 |

(Continued)

FOREIGN PATENT DOCUMENTS

CN    108519890 A  *  9/2018  ............... G06F 8/70

OTHER PUBLICATIONS

Blevins, Terra, and Luke Zettlemoyer. "Moving down the long tail of word sense disambiguation with gloss-informed biencoders." arXiv preprint arXiv:2005.02590 (2020). https://arxiv.org/pdf/2005.02590.pdf (Year: 2020).*

(Continued)

*Primary Examiner* — Pierre Louis Desir
*Assistant Examiner* — Keisha Y. Castillo-Torres
(74) *Attorney, Agent, or Firm* — F. CHAU & ASSOCIATES, LLC

(57) ABSTRACT

Systems and methods for natural language processing are described. Embodiments of the inventive concept are configured to receive an input sequence and a plurality of candidate long forms for a short form contained in the input sequence, encode the input sequence to produce an input sequence representation, encode each of the plurality of candidate long forms to produce a plurality of candidate long form representations, wherein each of the candidate long form representations is based on a plurality of sample expressions and each of the sample expressions includes a candidate long form and contextual information, compute a plurality of similarity scores based on the candidate long form representations and the input sequence representation, and select a long form for the short form based on the plurality of similarity scores.

13 Claims, 10 Drawing Sheets

(56) References Cited

U.S. PATENT DOCUMENTS

| | | | |
|---|---|---|---|
| 2022/0068462 A1* | 3/2022 | Dolan | G10L 25/63 |
| 2022/0108615 A1* | 4/2022 | Li | G06N 3/049 |

OTHER PUBLICATIONS

Pesaranghader A, Matwin S, Sokolova M, Pesaranghader A. deepBioWSD: effective deep neural word sense disambiguation of biomedical text data. J Am Med Inform Assoc. May 1, 2019;26(5):438-446. doi: 10.1093/jamia/ocy189. PMID: 30811548; PMCID: PMC7787358. (Year: 2019).*

Joopudi, Venkata, Bharath Dandala, and Murthy Devarakonda. "A convolutional route to abbreviation disambiguation in clinical text." Journal of biomedical informatics 86 (2018): 71-78. https://www.sciencedirect.com/science/article/pii/S1532046418301552 (Year: 2018).*

Henriksson, A., Moen, H., Skeppstedt, M et al. Synonym extraction and abbreviation expansion with ensembles of semantic spaces. J Biomed Semant 5, 6 (2014). https://doi.org/10.1186/2041-1480-5-6 (Year: 2014).*

Wu, et al., "Clinical Abbreviation Disambiguation using Neural Word Embeddings", In Proceedings of BioNLP, 15, pp. 171-176 (2015).

Pesaranghader, et al., "deepBioWSD: effective deep neural word sense disambiguation of biomedical text data", J. Am. Med. Informatics Assoc. 26, pp. 438-446 (2019).

Charbonnier, et al., "Using Word Embeddings for Unsupervised Acronym Disambiguation", In Proceedings of the 27th International Conference on Computational Linguistics (Association for Computational Linguistics, Santa Fe, New Mexico, USA, 2018), 10 pages.

Blevins, et al., "Moving Down the Long Tail of Word Sense Disambiguation with Gloss-Informed Biencoders", arXiv preprint arXiv:2005.02590 (2020), 12 pages.

Ciosici, et al., "Unsupervised Abbreviation Disambiguation", arXiv preprint arXiv:1904.00929 (2019), 27 pages.

* cited by examiner

ACRONYM DEFINITION NETWORK

BACKGROUND

The following relates generally to natural language processing, and more specifically to acronym definition using machine learning.

Natural language processing (NLP) refers to techniques for using computers to interpret natural language. In some cases, natural language expressions include short forms of words or phrases (e.g., abbreviations and acronyms). However, the meaning of these short forms can be ambiguous, and can depend on context.

Conventional NLP systems use short form or acronym definition techniques that are limited to a fixed number of acronyms. For example, they may only be capable of identifying the same terms that were seen during training. These systems are prone to make mistakes when multiple long forms exist for a new acronym that was not seen during training. Therefore, there is a need in the art for an improved acronym definition tool that can accurately predict the long form for unseen acronyms or abbreviations.

SUMMARY

The present disclosure describes systems and methods for performing natural language processing. Embodiments of the disclosure provide an acronym definition network. The acronym definition network encodes an input sequence having a short form (i.e., an acronym or an abbreviation) and a set of candidate long forms for the short form. A suitable long form is selected for the short form based on sample sentences gathered for each candidate. According to certain embodiments, the acronym definition network is trained using a multitask loss function.

A method, apparatus, and non-transitory computer readable medium for natural language processing are described. Embodiments of the method, apparatus, and non-transitory computer readable medium are configured to receive an input sequence and a plurality of candidate long forms for a short form contained in the input sequence, encode the input sequence to produce an input sequence representation, encode each of the plurality of candidate long forms to produce a plurality of candidate long form representations, wherein each of the candidate long form representations is based on a plurality of sample expressions and each of the sample expressions includes a candidate long form and contextual information, compute a plurality of similarity scores based on the candidate long form representations and the input sequence representation, and select a long form for the short form based on the plurality of similarity scores.

A method, apparatus, and non-transitory computer readable medium of training a neural network for natural language processing are described. Embodiments of the method, apparatus, and non-transitory computer readable medium are configured to identify a training set comprising a plurality of input sequences, wherein each of the input sequences contains a short form and is associated with a plurality of candidate long forms and a ground truth long form, encode each of the input sequences to produce an input sequence representation, encode each of the plurality of candidate long forms to produce a plurality of candidate long form representations, compute a probability value for each of the plurality of candidate long forms based on the input sequence representation and the candidate long form representations, compute a multitask loss function including a first term based on a probability value for the ground truth long form, a second term based on sample expression representations for each of the plurality of candidate long forms, and a third term based on the candidate long form representations, and update parameters of the neural network based on the multitask loss function.

An apparatus and method for natural language processing are described. Embodiments of the apparatus and method include an input sequence encoder configured to encode an input sequence to produce an input sequence representation, wherein the input sequence includes a short form, a long form encoder configured to encode each of a plurality of candidate long forms for the short form to produce a plurality of candidate long form representations, wherein each of the candidate long form representations is encoded based on a plurality of sample expressions that include a corresponding candidate long form, and a long form selection component configured to select a long form for the short form by comparing each of the candidate long form representations to the input sequence representation.

DETAILED DESCRIPTION

The present disclosure describes systems and methods for performing natural language processing (NLP). Embodiments of the disclosure include an acronym definition network that selects a suitable long form for a given short form found in a natural language expression.

Some NLP systems use machine learning to perform acronym or short form replacement tasks. However, conventional NLP systems are only capable of accurately identifying a fixed number of acronyms (i.e., those that were seen during training). Furthermore, these systems require a large amount of input (e.g., a paragraph-length context).

By contrast, embodiments of the present disclosure include an improved acronym definition network that accurately identifies unseen acronyms abbreviations using a single sentence as input. For example, an embodiment of the present disclosure employs the unconventional step of representing multiple candidate long-forms using sample sentences that may be automatically extracted, e.g., from the internet. An example network according to embodiments of the present disclosure is more accurate than conventional networks when interpreting short forms that were not seen during training.

Embodiments of the present disclosure include an encoder-based zero-shot acronym definition network. The network represents the long-forms of the acronyms using samples (where each sample includes a natural language expression in which one of the long forms of the acronym appears). A multi-task loss function may be used during training to increase the quality of the long form representations. Then, the candidate long form representations are scored using a decoder network, and the representation with the highest score is selected as the long form for the acronym or abbreviation.

According to some embodiments, given a text containing an acronym and several possible long forms for the acronym, the acronym definition network determines the correct long form of the acronym as used in the input text. The choice of the correct long form depends on the context (i.e., the text in which the acronym appears). The model can predict which proper long form an acronym corresponds to in a given text, regardless of whether the particular short form (i.e., the acronym) was seen during training. The network employs the context of the input sentence and information about the possible long forms to find the correct long form of the acronym.

System Overview

Figure 1:
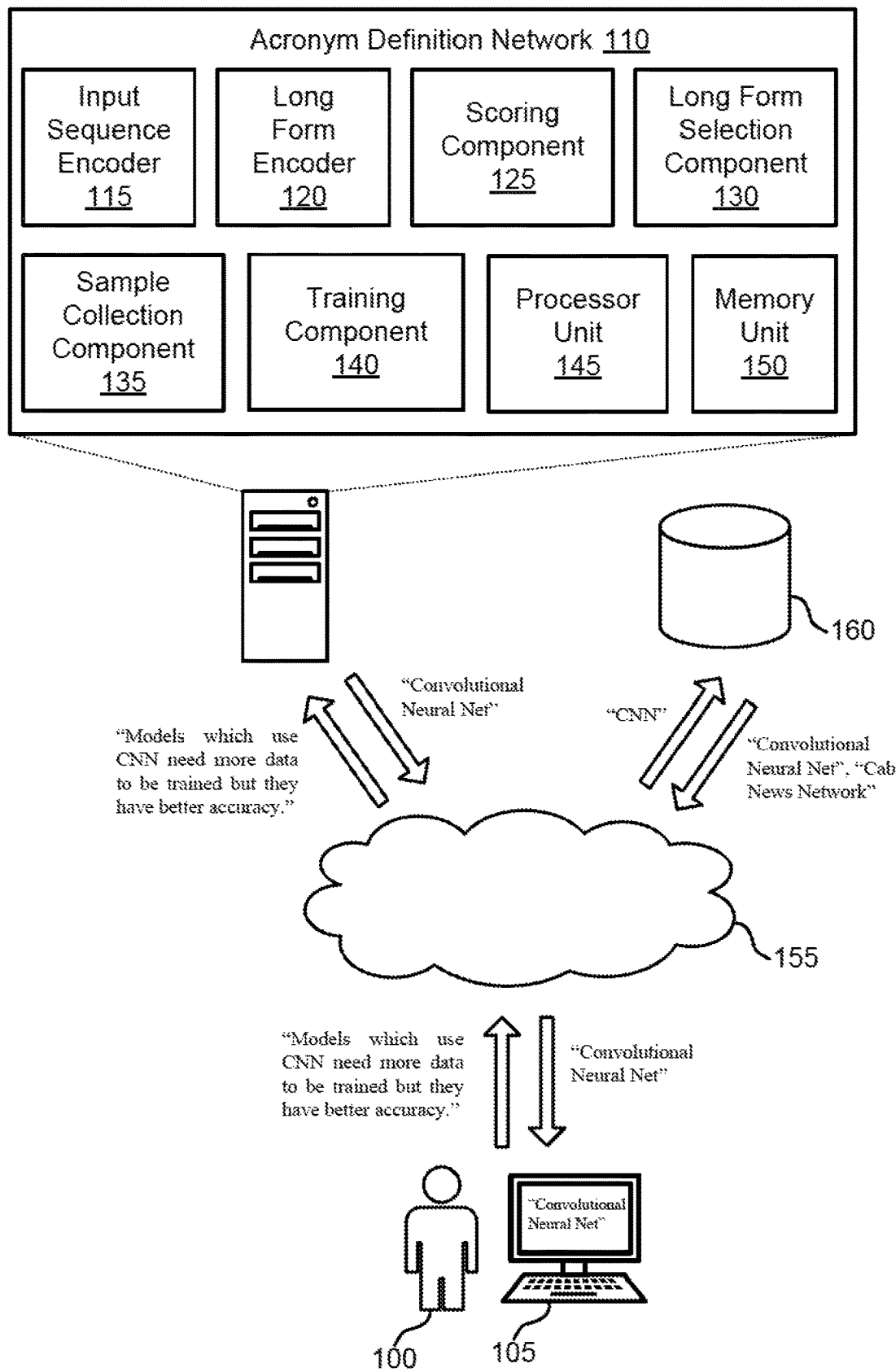
FIG. 1 shows an example of a system for natural language processing according to aspects of the present disclosure.

FIG. 1 shows an example of a system for natural language processing according to aspects of the present disclosure. The example shown includes user 100, user device 105, acronym definition network 110, cloud 155, and database 160. In some embodiments, acronym definition network 110 includes input sequence encoder 115, long form encoder 120, scoring component 125, long form selection component 130, sample collection component 135, training component 140, processor unit 145, and memory unit 150. In some embodiments, the components and functions of the acronym definition network 110 are located on the user device 105.

The user 100 may communicate with the acronym definition network 110 via the user device 105 and the cloud 155. The user may provide an input sentence (i.e., an ordered set of words including a short form such as an acronym). The input sentence is provided to the acronym definition network, which returns the predicted long form for the short form in the input sentence. The user 100 may communicate with the database 160 via the user device 105 and the cloud 155. The short form is input to the database 160, which returns a set of candidate long forms for the short form.

The user device 105 may be a personal computer, laptop computer, mainframe computer, palmtop computer, personal assistant, mobile device, or any other suitable processing apparatus.

A processor unit 145 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 145 is configured to operate a memory array using a memory controller. In other cases, a memory controller is integrated into the processor unit 145. In some cases, the processor unit 145 is configured to execute computer-readable instructions stored in a memory to perform various functions. In some embodiments, a processor unit 145 includes special purpose components for modem processing, baseband processing, digital signal processing, or transmission processing.

Examples of a memory unit 150 include random access memory (RAM), read-only memory (ROM), or a hard disk. Examples of the memory unit 150 include solid state memory and a hard disk drive. In some examples, memory unit 150 is used to store computer-readable, computer-executable software including instructions that, when executed, cause a processor to perform various functions described herein. In some cases, the memory unit 150 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 150 store information in the form of a logical state.

A database 160 is an organized collection of data. For example, a database 160 stores data in a specified format known as a schema. A database 160 may be structured as a single database 160, a distributed database 160, multiple distributed databases 160, or an emergency backup database 160. In some cases, a database 160 controller may manage data storage and processing in a database 160. In some cases, a user 100 interacts with database 160 controller. In other cases, database 160 controller may operate automatically without user 100 interaction. In some examples, the database 160 includes a set of candidate long forms for a given acronym from an input sentence.

A cloud 155 is a computer network configured to provide on-demand availability of computer system resources, such as data storage and computing power. In some examples, the cloud 155 provides resources without active management by the user 100. The term cloud 155 is sometimes used to describe data centers available to many users over the Internet. Some large cloud networks have functions distributed over multiple locations from central servers. A server is designated an edge server if it has a direct or close connection to a user. In some cases, a cloud 155 is limited to a single organization. In other examples, the cloud 155 is available to many organizations. In one example, a cloud 155 includes a multi-layer communications network comprising multiple edge routers and core routers. In another example, a cloud 155 is based on a local collection of switches in a single physical location.

In some embodiments, the acronym definition network 110 includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A loss function may be used to determine how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are mode during the next iteration.

In some examples, an ANN may refer to a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In some embodiments, the acronym definition network 110 includes a convolutional neural network (CNN). For example, an input sequence encoder and/or a long form encoder used to generate vector representation of input sequence and long forms may include convolutional layers. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, input sequence encoder 115 receives an input sequence and a set of candidate long forms for a short form contained in the input sequence, and encodes the input sequence to produce an input sequence representation. The input sequence encoder 115 then embeds each word of the input sequence using a pre-trained word embedding component, and combines the embedded words of the input sequence.

In some examples, input sequence encoder 115 encodes a context of the input sequence by applying a long short-term memory (LSTM) component to the embedded words of the input sequence. An LSTM refers to a form of RNN that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

In some examples, the input sequence encoder 115 applies a max pooling layer to an output of the LSTM component, and concatenates the combined embedded words of the input sequence with an embedding of the short form to produce the input sequence representation. According to an embodiment, the short form was not used for training the input sequence encoder 115 or the long form encoder 120.

According to some embodiments, input sequence encoder 115 encodes each of the input sequences to produce an input sequence representation, and identifies a development set including additional input sequences. In some cases, each of the additional input sequences contains an additional short form and is associated with a set of additional candidate long forms and an additional ground truth long form.

In some examples, input sequence encoder 115 identifies a test set including additional input sequences, where each of the additional input sequences contains an additional short form and is associated with a set of additional candidate long forms and an additional ground truth long form.

According to some embodiments, input sequence encoder 115 is configured to encode an input sequence to produce an input sequence representation, where the input sequence includes a short form. The input sequence encoder 115 includes a word embedding component, an LSTM component, a max pooling layer, a concatenation function, and a feed forward layer.

According to some embodiments, long form encoder 120 encodes each of the set of candidate long forms to produce a set of candidate long form representations, where each of the candidate long form representations is based on a set of sample expressions and each of the sample expressions includes a candidate long form and contextual information. In some examples, long form encoder 120 embeds each word of the set of sample expressions using a pre-trained word embedding component, and combines the embedded words of each sample expression to produce a sample expression representation for each of the set of sample expressions, where each of the candidate long form representations is based on the sample expression representations for the corresponding sample expressions.

Then, the long form encoder 120 applies a max pooling layer to the embedded words of each sample expression, and applies a feed forward layer to an output of the max pooling layer. In some cases, the long form encoder 120 averages the output of the feed forward layer for the sample expressions corresponding to each of the candidate long forms to produce the candidate long form representations.

According to some embodiments, long form encoder 120 encodes each of the set of candidate long forms to produce a set of candidate long form representations. According to some embodiments, each of the candidate long form representations is encoded based on a set of sample expressions that include a corresponding candidate long form. In some examples, the long form encoder 120 includes a word embedding component, a max pooling layer, a feed forward layer, and an averaging function.

After computing the input sequence representation and the long-form representations for all long forms in the set of candidate long forms, the acronym definition network computes a score for each long-form using scoring component 125 and chooses the long-form with the highest score as the prediction to disambiguate the acronym in sentence. The model computes the scores of each long form using the representations from different abstract levels. According to an embodiment, the model includes computing multiple scores.

According to some embodiments, scoring component 125 computes a set of similarity scores based on the candidate long form representations and the input sequence representation. The scoring component 125 generates a first cosine similarity based on an intermediate input sequence representation and an intermediate long form representation for each of the candidate long forms. The scoring component 125 generates a second cosine similarity between the input sequence representation and the intermediate long form representation for each of the candidate long forms. The scoring component 125 generates a third cosine similarity between the input sequence representation and the candidate long form representation for each of the candidate long forms. In some examples, scoring component 125 computes a weighted sum of the first cosine similarity, the second cosine similarity and the third cosine similarity for each of the candidate long forms, where the long form for the short form is selected based on the weighted sum.

According to some embodiments, scoring component 125 computes a probability value for each of the set of candidate long forms based on the input sequence representation and the candidate long form representations.

According to some embodiments, long form selection component 130 selects a long form for the short form based on the set of similarity scores. The long form selection component 130 is configured to select a long form for the short form by comparing each of the candidate long form representations to the input sequence representation.

According to some embodiments, the input sequence encoder encodes the given input into a vector representation. The long form encoder computes a vector representation for each possible long form. The scoring component uses the vector representations computed by the input sequence encoder and the long-form encoder to compute the score of each possible long form from the set of candidate long forms. The long form selection component 130 selects the long form with the highest score as the prediction to expand the ambiguous acronym in the input sentence.

According to some embodiments, sample collection component 135 extracts the sample expressions from an online source. In some cases, the sample expressions are also referred to as sample sentences or sample sequences. To represent the long-form of the set of candidate long forms, the acronym definition network does not directly use the embeddings of the words appearing in the long-form (e.g., embeddings of the words "Convolutional", "Neural", and "Network" for the long form "Convolution Neural Network"). In an embodiment, the acronym definition network computes a vector representation for each long-form using the sentences extracted from the internet that contain the long-from. The advantage of this approach is that the sample sentences of each long-form are more informative than the words of the long-form itself, therefore the network encodes the long-forms more efficiently. In addition, in cases where the long form contains a word which is not in the vocabulary (i.e., out-of-vocabulary (OOV) words), the acronym definition network is dependent upon the sample sentences to gain information regarding the meaning of the long-form with OOVs.

According to an embodiment, to extract samples for each long from in the set of candidate long forms, Wikipedia® corpus is used. In some cases, this corpus can be replaced with any other large corpus such as Common Crawl. Any sentence in the introduction section of a Wikipedia® article that contains the long form is selected. The acronym definition network creates a sample set for the long form.

According to some embodiments, training component 140 identifies a training set including a set of input sequences, where each of the input sequences contains a short form and is associated with a set of candidate long forms and a ground truth long form. In some examples, training component 140 computes a multitask loss function including a first term based on a probability value for the ground truth long form, a second term based on sample expression representations for each of the set of candidate long forms, and a third term based on the candidate long form representations. The training component 140 updates parameters of the neural network based on the multitask loss function.

According to some embodiments, the first term represents a first training task of predicting a correct long form for the short form. The second term represents a second training task of ensuring that the sample expression representations for a candidate long form are sufficiently similar. The third term represents a third training task of ensuring that the candidate long form representations for different candidate long forms are sufficiently different. In some examples, training component 140 computes the multitask loss function for the additional input sequences. In some examples, training component 140 updates hyperparameters of the neural network based on computing the multitask loss function for the additional input sequences.

In some other examples, training component 140 evaluates the neural network based on computing the multitask loss function for the additional input sequences. The neural network includes an input sequence encoder 115 for encoding the input sequences and a long form encoder 120 for encoding the set of candidate long forms.

Figure 2:
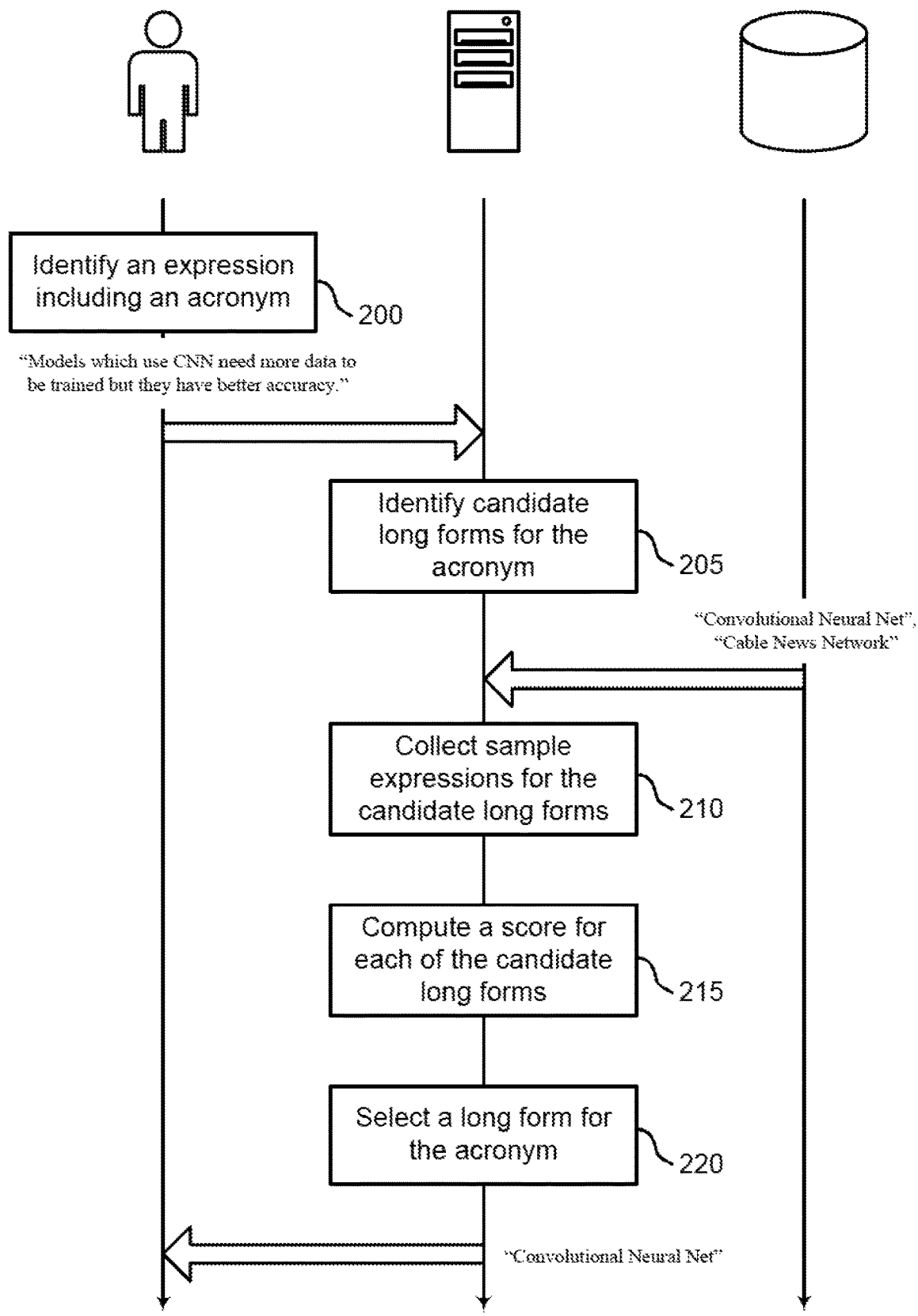
FIGS. 2 and 3 show examples of a process for natural language processing according to aspects of the present disclosure.

FIG. 2 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user identifies an expression including an acronym. The expression is an input sentence that includes a short form. According to an example, the input sentence is "Models which use CNN need more data to be trained but they have better accuracy." The output of the model is "Convolutional Neural Net". The user may not be familiar with the short form due to various reasons. The user is interested in knowing the correct long form for the short form (i.e., acronym) to better understand the meaning of the sentence. In some cases, the operations of this step refer to, or may be performed by, a user as described with reference to FIG. 1.

At operation 205, the system identifies candidate long forms for the acronym. According to the above example, candidate long forms at least include "Convolutional Neural Net" and "Cable News Network". The acronym of each of the candidate long forms is "CNN". In some cases, the user is confused as to which one of the candidate long forms is the correct long form for "CNN" based on the context. In some cases, the operations of this step refer to, or may be performed by, an acronym definition network as described with reference to FIG. 1.

At operation 210, the system collects sample expressions for the candidate long forms. According to an embodiment, the system computes a vector representation for each long form using the sentences extracted from the internet (i.e., sources and webpages on the Internet) that contain the long form. The sample sentences of each long form are more informative than the words of the long form itself, such that the system can encode the long forms more efficiently. In addition, in cases where the long form contains a word which is not in the vocabulary (i.e., out-of-vocabulary (OOV) words), the system gains information about the meaning of the long form with OOVs from the sample sentences.

To extract sample expressions for each long from (in the example above, "Convolutional Neural Net", "Cable News Network"), Wikipedia® corpus is used. In some cases, Wikipedia® corpus can be replaced with any other large corpus (e.g., Common Crawl). Any sentence in the introduction section of a Wikipedia® article that contains the long form is selected. In some cases, the operations of this step refer to, or may be performed by, a sample collection component as described with reference to FIG. 1.

At operation 215, the system computes a score for each of the candidate long forms. In some cases, the input sequence encoder encodes the given input into a vector representation. The long form encoder computes a vector representation for each possible long form. The scoring component uses the vector representations computed by the input sentence encoder and the long form encoder to compute the score for each possible long form. In some cases, the operations of this step refer to, or may be performed by, a scoring component as described with reference to FIG. 1.

At operation 220, the system selects a long form for the acronym. The long form with the highest score is selected as the prediction to expand the ambiguous acronym in the input sentence. In the example above, the system selects and returns "Convolutional Neural Net" because this candidate long form has the highest score (i.e., predicted by the acronym definition network). The long form is sent back to the user. After viewing the predicted long form for "CNN", the user can have a better understanding of the meaning of the input sentence. In some cases, the operations of this step refer to, or may be performed by, a long form selection component as described with reference to FIG. 1.

Figure 3:
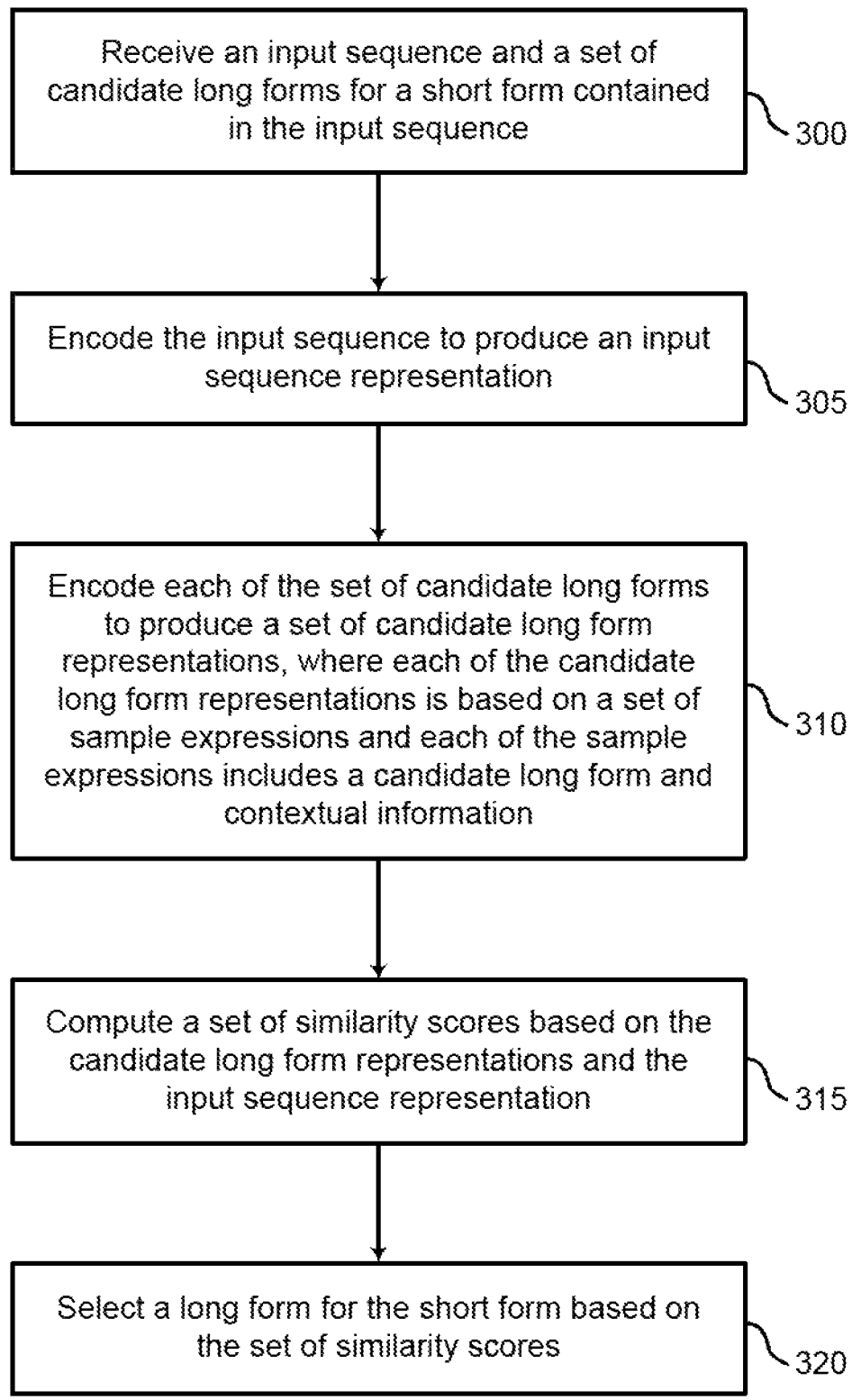

FIG. 3 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the system receives an input sequence and a set of candidate long forms for a short form contained in the input sequence. According to an embodiment, the model includes an input sequence encoder, a long form encoder, and a scoring component. The input to the model is a sequence of words, the position of the ambiguous acronym, and the possible long forms for the acronym. In some cases, the operations of this step refer to, or may be performed by, an input sequence encoder as described with reference to FIG. 1.

At operation 305, the system encodes the input sequence to produce an input sequence representation. According to an embodiment, the input sentence encoder encodes the given input into a vector representation. In some cases, the operations of this step refer to, or may be performed by, an input sequence encoder as described with reference to FIG. 1. Details of this operation is described in FIG. 4.

According to some embodiments, the input sequence (words and short form) is input to a word embedding component (e.g., BERT encoder) to generate word embeddings (i.e., word embeddings and short form embeddings). The BERT representation of the input sentence E is input to a LSTM layer to consume the representations E and generate the hidden states, i.e., LSTM output. The LSTM output is input to a max pooling layer, where the model computes the max pooling along each dimension of the hidden states of the words to obtain the sentence representation $\hat{h}$. The model concatenates the corresponding hidden state of the acronym with the sentence representation $\hat{h}$, i.e., to generate combined output. The combined output is input to a feed forward layer to generate input sequence representation $\bar{h}$.

At operation 310, the system encodes each of the set of candidate long forms to produce a set of candidate long form representations, where each of the candidate long form representations is based on a set of sample expressions and each of the sample expressions includes a candidate long form and contextual information. According to an embodiment, the long form encoder computes a vector representation for each possible long form. In some cases, the operations of this step refer to, or may be performed by, a long form encoder as described with reference to FIG. 1. Details of this operation is described in FIG. 6.

According to some embodiments, the model creates a sample set for the long form. To represent the long form using its samples, the model converts the sample sentence into a vector. Each sample expression (i.e., candidate long form and contextual information) is input to a word embedding component. In some cases, the word embedding component includes a BERT encoder, which is used to compute the vector representation for the sample sentence. Word embeddings are then input to a max pooling layer to generate combine output, i.e., a vector representation of the sample sentences. The combined output is input to a feed forward layer to generate feed forward output. The model filters out the irrelevant information in the vector representation of the sample sentences using the feed forward layer. A filtered representation (i.e., the feed forward output) is computed for the sample sentence. The filtered representation is input to an averaging component. The model represents the long form by averaging the filtered representations.

At operation 315, the system computes a set of similarity scores based on the candidate long form representations and the input sequence representation. According to an embodiment, the scoring component of the model uses the vector representations computed by the input sequence encoder and the long form encoder to compute the score of each possible long form. The long form with the highest score is selected as the system's prediction to expand the ambiguous acronym in the input sentence (or input sequence). In some cases, the operations of this step refer to, or may be performed by, a scoring component as described with reference to FIG. 1.

After computing the input sentence representation $\bar{h}$ and the long-form representations l for all long-forms in D, the model computes a score for each long form and choose the long form with the highest score as the system's prediction to disambiguate the acronym $w_a$ in sentence W. However, this approach might decrease the performance of the model at inference time. This may occur because the more layers in the model the more abstract features are extracted from the training data by the model. To avoid decrease in performance at the inference time, the model computes the scores of each long form using the representations from different abstract levels. According to an embodiment, the model computes multiple types of scores.

The cosine similarity between the max pooled BERT encoded representation of the input sentence, i.e., $\tilde{e} = \text{MAX\_POOL}(E)^2$, and the long-form representation computed from the BERT encoded representation of the samples of each long-form, i.e., $$\bar{l} = \frac{1}{|\tilde{S}_l|} \sum_{s_i^l} s_i^l.$$

The model computes a first score as follows:

$$\text{score}_1 = \sigma(\tilde{e}) \odot \sigma(\bar{l}) \quad (1)$$

where $\sigma$ is the softmax function and $\odot$ is the Hadamard product. The two vectors $\tilde{e}$ and $\bar{l}$ are directly computed from the BERT model. The parameters of the BERT encoder are fixed in the model, therefore this score does not change during training and serves as a basic score which helps the model avoid overfitting.

The cosine similarity between the input sentence representation, $\bar{h}$, and the long-form representation computed from the BERT encoded representation of the samples of each long-form, $$\tilde{l} = \frac{1}{|\tilde{S}_l|} \sum_{s_i^l} s_i^l.$$

The model computes a second score as follows:

$$\text{score}_2 = \sigma(\bar{h}) \odot \sigma(\tilde{l}) \quad (2)$$

where $\sigma$ is the softmax function and $\odot$ is the Hadamard product. This score is an intermediate score which computes the interaction between the more abstract input sentence representation with the fixed representations of the long-forms.

The cosine similarity between the input sentence representation, $\bar{h}$, and the long-form representation computed from the filtered sample representations, l. The model computes a third score as follows:

$$\text{score}_3 = \sigma(\bar{h}) \odot \sigma(l) \quad (3)$$

where $\sigma$ is the softmax function and $\odot$ is the Hadamard product. This score is the highest level score computed from the abstract representations of the input sentence and the long forms. The $\text{score}_1$ and $\text{score}_2$ are optimized during training, capturing the interactions between the input sentence and possible long forms which could not be obtained from the embedding level representations of them.

According to an embodiment, to compute the overall score for each long form, the model computes the weighted sum of the three above scores:

$$\text{score} = \alpha_s * \text{score}_1 + \beta_s * \text{score}_2 + \lambda_s * \text{score}_3 \quad (4)$$

where the $\alpha_s$, $\beta_s$, and $\lambda_s$ are the trade-off parameters to be fine-tuned using the performance on the development set.

To predict the correct long form of the given input, the model selects the long form with the highest score as the model's prediction to the user.

At operation 320, the system selects a long form for the short form based on the set of similarity scores. After computing the input sequence representation and the long-form representations for all the long forms, the model computes a score for each long form and choose the long form with the highest score as the prediction to disambiguate the acronym in the sentence. The selected long form is shown to the user as the appropriate long form for the short form in the sentence. In some cases, the operations of this step refer to, or may be performed by, a long form selection component as described with reference to FIG. 1.

Input Sequence Encoder

Figure 4:
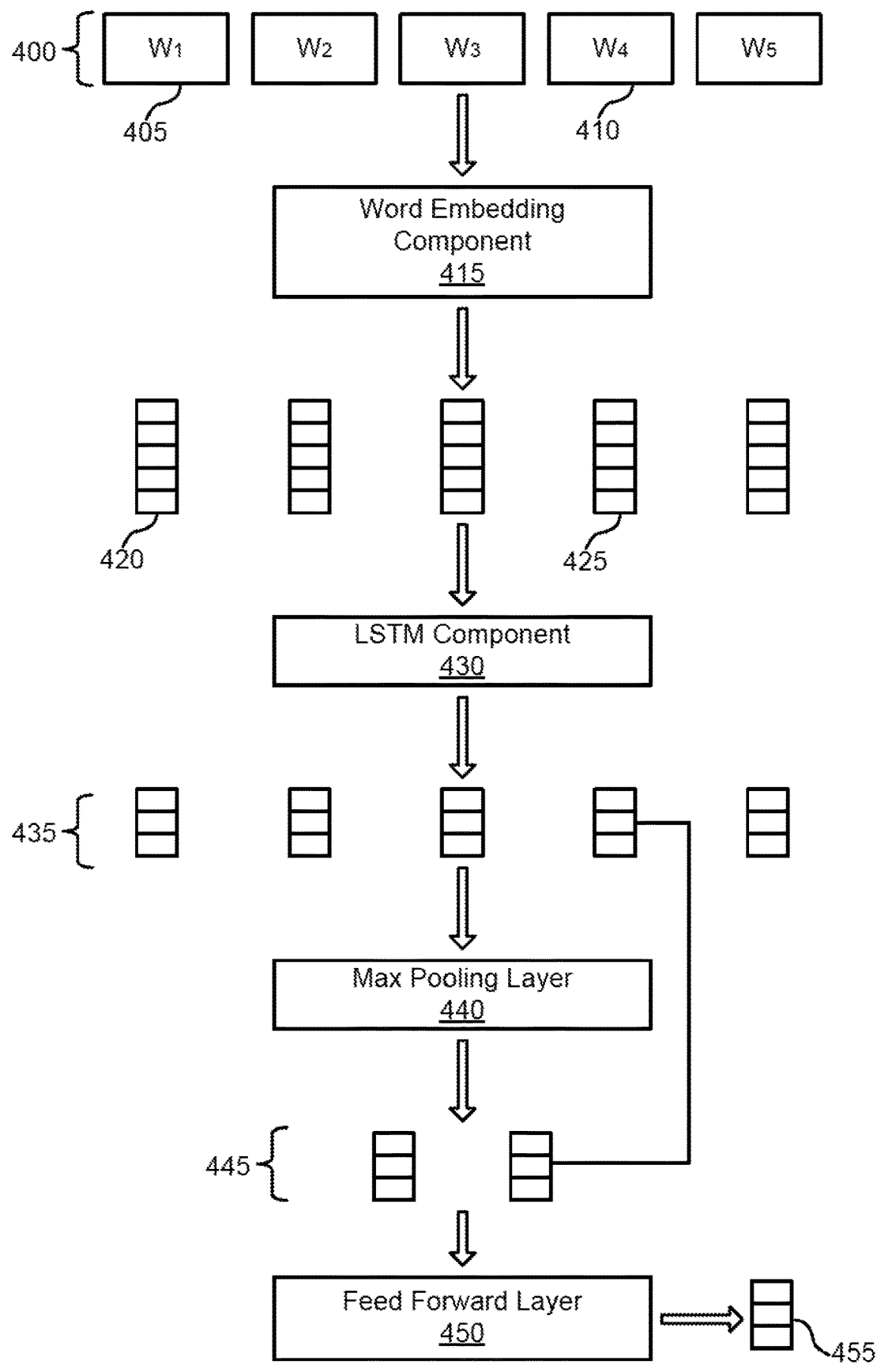
FIG. 4 shows an example of an input sequence encoder according to aspects of the present disclosure.

FIG. 4 shows an example of an input sequence encoder according to aspects of the present disclosure. The example shown includes input sequence 400, word embedding component 415, word embeddings 420, short form embedding 425, LSTM component 430, LSTM output 435, max pooling layer 440, combined output 445, feed forward layer 450, and input sequence representation 455. In one embodiment, input sequence 400 includes words 405 and short form 410. The short form 410 may be at any position of the input sequence 400. According to an example illustrated in FIG. 4, the input sequence has five words, the short form is located as the fourth word. However, position of the short form is not limited thereto and can be at any position of the input sequence (e.g., beginning, end, or middle).

In some cases, scalars/strings are denoted using lower-case letters, vectors are denoted using bold lower-case letters, matrices are denoted using bold upper-case letters, and sets are denoted using capital letters.

According to an embodiment, the input sequence 400 to the model is a sequence of words $W=[w_1, w_2, \ldots, w_n]$, the position of the ambiguous acronym a, and the possible long-forms of the acronym $w_p$, i.e., $D=[\iota_1, \iota_2, \ldots, \iota_k]$. The output of the model chooses one of the possible long forms $\iota$ from D as the true meaning of the acronym $w_a$. The model leverages three components including an input sentence encoder, a long form encoder, and a scoring component. The input sentence encoder is also referred to as input sequence encoder. The input sequence encoder encodes the given input into a vector representation. The long form encoder computes a vector representation for each possible long-form in D. The scoring component uses the vector representations computed by the input sentence encoder and the long form encoder to compute the score of each possible long form. The long form with the highest score is selected as the model's prediction to expand the ambiguous acronym $w_a$ in the input sentence W. In some cases, the model herein is also referred to as the acronym definition network or the network.

In some examples, the word embedding component 415 includes a pre-trained BERT model (i.e., BERT encoder). Word embedding component 415 is an example of, or includes aspects of, the corresponding element described with reference to FIG. 6. Word embeddings 420 is an example of, or includes aspects of, the corresponding element described with reference to FIG. 6.

To compute the vector representation of the input sentence W, the model uses the BERT encoder which is a transformer-based encoder. In some examples, the input sequence "[CLS]$w_1 w_2 \ldots w_n$[SEP]" is input to the BERT encoder and the hidden states of the last layer in BERT encoder are employed as the vector representation of the input sentence W. As the BERT encoder converts the input sequence of words, i.e., $[w_1, w_2, \ldots, w_n]$ into the sequence of word-piece representations, i.e., $[P_1, P_2, \ldots, P_m]$ where $m \geq n$, the model computes the representation of the word $w_i$ by averaging its word-piece representations as follows:

$$e_i = \frac{1}{|P_i|} \sum_{P_j \in P_i} p_j \quad (5)$$

where $P_i$ is the set of word-pieces of the i-th word, i.e., $w_i$, $|\cdot|$ denotes the size of the set and $e_i$ is the vector representations of the word $w_i$. The BERT representation of the input sentence, i.e., E=[$e_1$, $e_2$, ..., $e_n$], is input to the subsequent layers. The BERT representation E includes word embeddings 420 and short form embedding 425. According to an embodiment, word embeddings 420 and short form embedding 425 are input to the LSTM component 430.

To fine-tune the representations E, the parameters of the BERT encoder are optimized during training. However, due to the large number of parameters of the BERT encoder, the process of optimization makes the model prone to overfitting and decreases its performance on the unseen sentences or acronyms in the evaluation phase. To prevent the overfitting issue, during training, parameters of the BERT encoder are fixed.

According to an embodiment, the model includes a long short-term memory (LSTM) layer (i.e., the LSTM component 430) on top of the BERT encoder to consume the representations E and generate the hidden states H=[$h_1$, $h_2$, ..., $h_n$]. According to an embodiment, the hidden state $h_t$ is computed as follows:

$$f_t = \sigma(W_f e_t + U_f h_{t-1} + b_f) \quad (6)$$

$$i_t = \sigma(W_i e_t + U_i h_{t-1} + b_i) \quad (7)$$

$$o_t = \sigma(W_o e_t + U_o h_{t-1} + b_o) \quad (8)$$

$$\hat{c}_t = \tanh(W_c e_t + U_c h_{t-1} + b_c) \quad (9)$$

$$c_t = f_t \cdot c_{t-1} + i_t \cdot \hat{c}_t \quad (10)$$

$$h_t = o_t \cdot \tanh(c_t) \quad (11)$$

where $h_{t-1}$ is the hidden state of the (t−1)-th word. In some cases, the hidden states H is also referred to as LSTM output 435.

The LSTM output 435 is input to max pooling layer 440. Max pooling layer 440 is an example of, or includes aspects of, the corresponding element described with reference to FIG. 6. According to an embodiment, after obtaining the hidden states H=[$h_1$, $h_2$, ..., $h_n$], the model computes a single vector representation for the entire sentence W. The model computes the max pooling along each dimension of the hidden states of the words to obtain the sentence representation $\hat{h}$. In one embodiment, the i-th dimension of the vector $\hat{h}$ is computed as:

$$\hat{h}_i = \max_{j \in \{1,2,...,n\}} h_j \quad (12)$$

where n is the size of the input sentence W.

In some cases, the output of the max pooling layer 440 includes the vector $\hat{h}$, which is also referred to as combined output 445. Combined output 445 is an example of, or includes aspects of, the corresponding element described with reference to FIG. 6.

According to an embodiment, the representation $\hat{h}$ may be ignorant of the given acronym $w_a$. In order to emphasize the acronym $w_a$ in the sentence representation, the model concatenates the corresponding hidden state of the acronym, $h_a$, with the sentence representation $\hat{h}$, and feed it to feed forward layer 450 (e.g., a two-layer feed forward layer):

$$\overline{h} = W_2 * (W_1 * [\hat{h}: h_a] + b_1) + b_2 \quad (13)$$

where $W_1$ and $W_2$ are weight matrices, $b_1$ and $b_2$ are biases and [:] represent concatenation. The vector $\hat{h}$ is used as the input sentence representation in the subsequent components.

In some cases, the vector $\hat{h}$ is also referred to as input sequence representation 455 (i.e., output of the feed forward layer 450).

According to some embodiments, the system is not dependent upon the existence of neither a domain-specific corpus to optimize the word embeddings nor an expanded context that the input sentence appears in it. Moreover, the system employs parametric models (e.g., LSTM network and the feed-forward layers) in the input sequence encoder to obtain more abstract representation of the input sentence. Using these parametric models in the input sequence encoder is challenging as they might make the model prone to overfitting, especially for a model (e.g., zero-shot) where the labels in the test set are not seen in the training phase.

Figure 5:
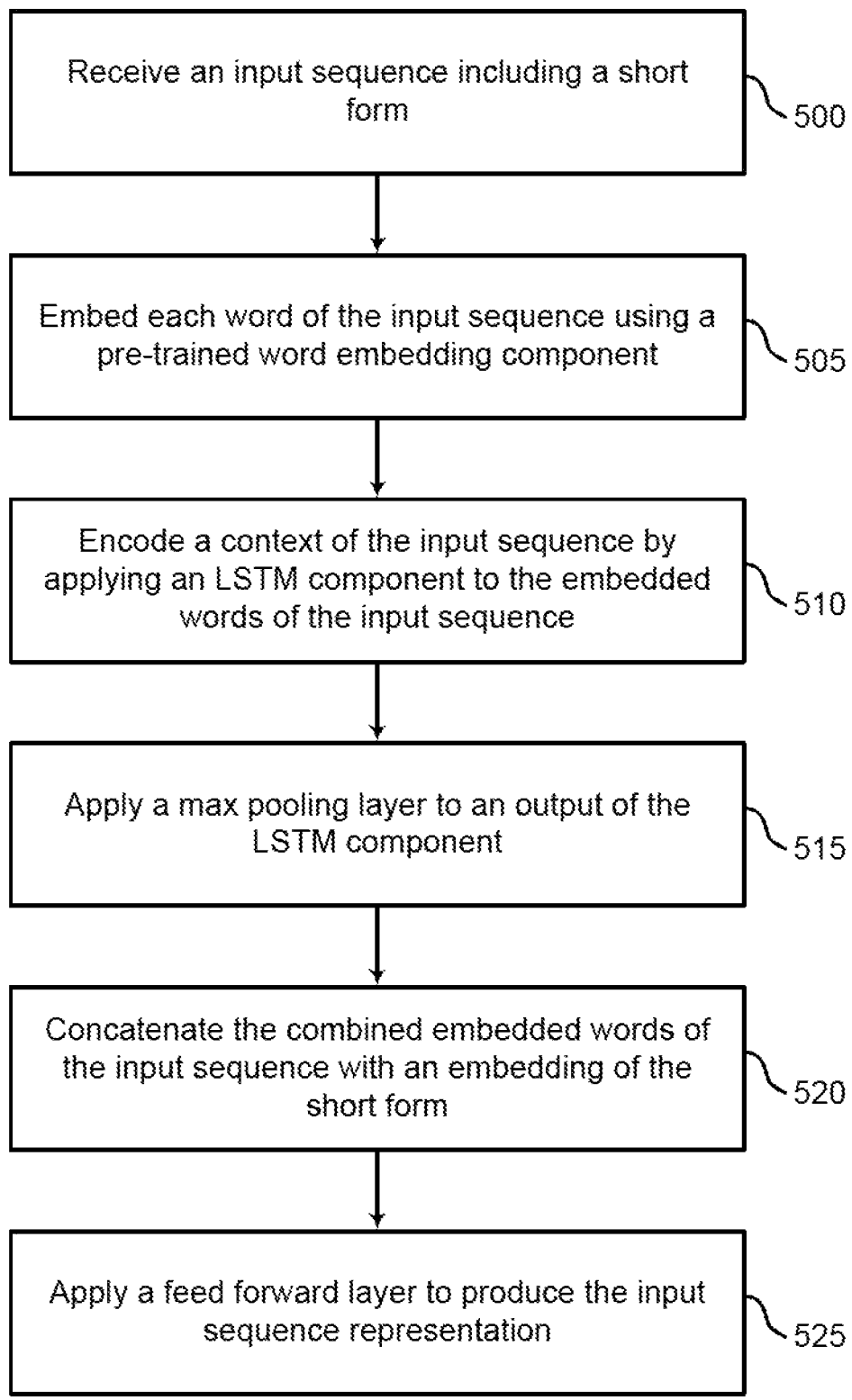
FIG. 5 shows an example of a process for input sequence encoding according to aspects of the present disclosure.

FIG. 5 shows an example of a process for input sequence encoding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives an input sequence including a short form. According to some embodiments, the input sequence encoder includes a word embedding component, an LSTM component, a max pooling layer, a concatenation function, and a feed forward layer.

According to an example, the input sentence is "Models which use CNN need more data to be trained but they have better accuracy." The short form is "CNN". The rest of the input sequence besides the short form is referred to as words. In some cases, the input sequence including words and a short firm (i.e., an acronym of interest) is input to an input sequence encoder of the acronym definition network. The acronym definition network is also referred to as the model or the network. In some cases, the operations of this step refer to, or may be performed by, an input sequence encoder as described with reference to FIG. 1.

At operation 505, the system embeds each word of the input sequence using a pre-trained word embedding component. According to an embodiment, the input sequence encoder includes a word embedding component. The word embedding component includes a pre-trained BERT model. The input sentence encoder encodes the given input (i.e., words and short form) into a vector representation. In some cases, the input sequence is input to the BERT encoder and the hidden states of the last layer in the BERT encoder are employed as the vector representation of the input sentence. In some cases, the operations of this step refer to, or may be performed by, an input sequence encoder as described with reference to FIG. 1.

At operation 510, the system encodes a context of the input sequence by applying an LSTM component to the embedded words of the input sequence. According an embodiment, the BERT representation of the input sentence is input to the LSTM component to generate LSTM output. The LSTM component is used to consume the representations and generate the hidden states. In some cases, the operations of this step refer to, or may be performed by, an input sequence encoder as described with reference to FIG. 1.

At operation 515, the system applies a max pooling layer to an output of the LSTM component. In some examples, a pooling layer may be added after the convolutional layer. The pooling layer may be used for ordering layers within a convolutional neural network that are repeated one or more times within a neural network model. The pooling layer operates upon each feature map separately to create a new set of the same number of pooled feature maps. In some cases, the size of the pooling operation is smaller than the size of the feature map. For example, the size of the pooling operation is 2×2 pixels with a stride of two pixels.

According to an embodiment, the LSTM output is input to the max pooling layer to generate combined output. In some cases, the model computes a single vector representation for the entire sentence. The model computes the max pooling along each dimension of the hidden states of the words to obtain the sentence representation. In some cases, the operations of this step refer to, or may be performed by, an input sequence encoder as described with reference to FIG. 1.

At operation 520, the system concatenates the combined embedded words of the input sequence with an embedding of the short form. To emphasize the acronym (e.g., "CNN") in the sentence representation, the model concatenates the corresponding hidden state of the acronym with the sentence representation. The combined output is input to a feed forward layer (e.g., two-layer feed forward layer). In some cases, the operations of this step refer to, or may be performed by, an input sequence encoder as described with reference to FIG. 1.

At operation 525, the system applies a feed forward layer to produce the input sequence representation. According to an embodiment, the feed forward layer generates an input sequence representation (i.e., this vector is used in subsequent components of the model). In some cases, the operations of this step refer to, or may be performed by, an input sequence encoder as described with reference to FIG. 1.

The model is not dependent upon the existence of neither a domain-specific corpus to optimize the word embeddings nor an expanded context that the input sentence appears in it. Moreover, the model employs parametric models (e.g., LSTM network and the feed-forward layers) in the encoder to obtain more abstract representation of the input sentence.

Lone Form Encoder

Figure 6:
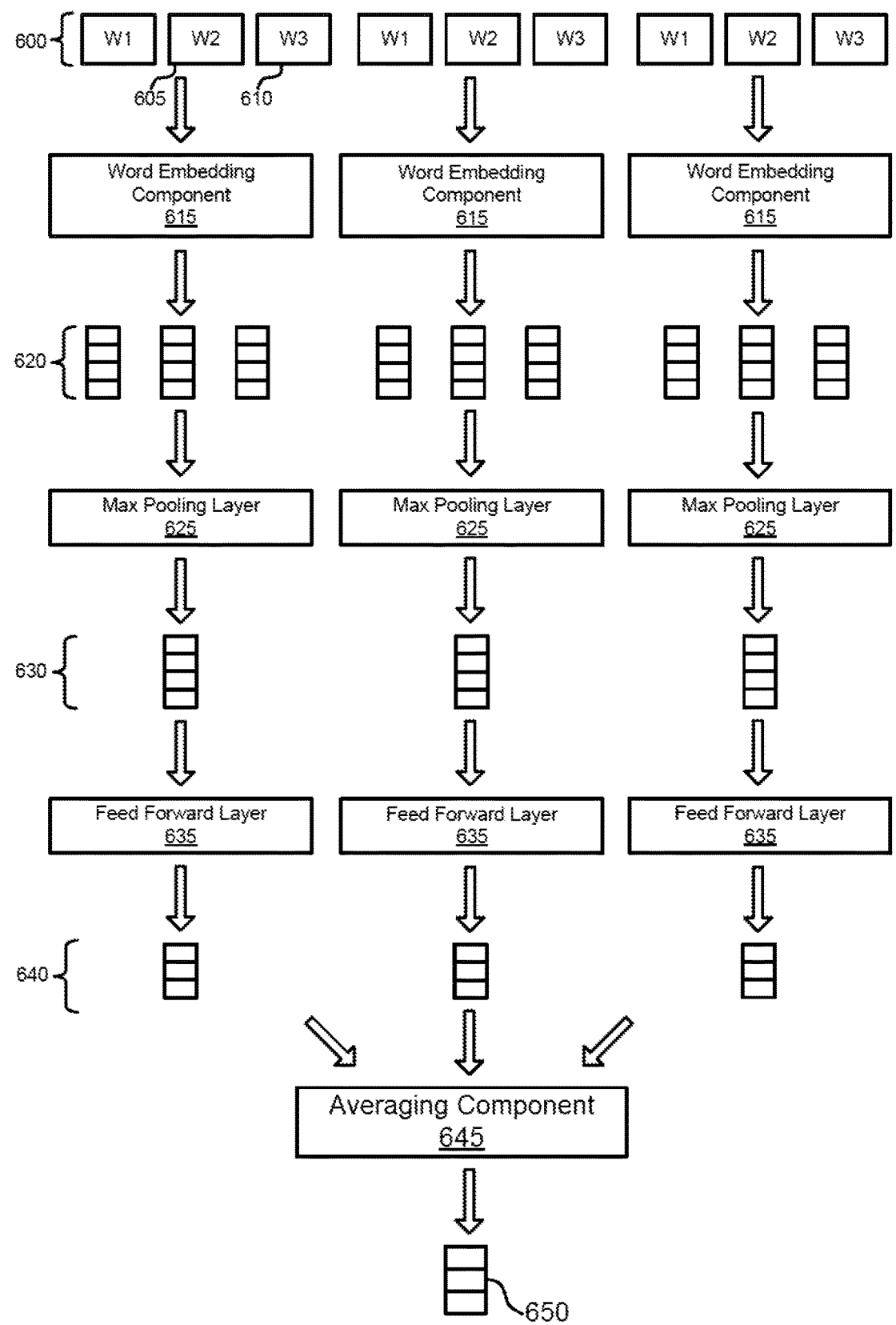
FIG. 6 shows an example of a long form encoder according to aspects of the present disclosure.

FIG. 6 shows an example of a long form encoder according to aspects of the present disclosure. The example shown includes sample expression 600, word embedding component 615, word embeddings 620, max pooling layer 625, combined output 630, feed forward layer 635, feed forward output 640, averaging component 645, and candidate long form representation 650. In one embodiment, sample expression 600 includes candidate long form 605 and contextual information 610.

According to an embodiment, the long form encoder encodes each of the set of candidate long forms to produce a set of candidate long form representations, where each of the candidate long form representations is based on a set of sample expressions and each of the sample expressions includes a candidate long form and contextual information. The long form encoder embeds each word of the set of sample expressions using a pre-trained word embedding component 615. The output of the word embedding component 615 includes word embeddings 620.

According to some embodiments, the long form encoder represents each long form ι provided in D by a vector. To represent the long-form ι, the model does not directly use the embeddings of the words appearing in the long-form (e.g., embeddings of the words "Convolutional", "Neural", and "Network" for the long-form "Convolution Neural Network"). According to an embodiment, the model computes a vector representation for each long form using the sentences extracted from the internet that contain the long form. The advantage of this approach is that the sample sentences of each long form are more informative than the words of the long-form itself, so the model can encode the long-forms more efficiently. In addition, in cases where the long form contains a word which is not in the vocabulary (i.e., out-of-vocabulary (OOV) words), the model relies on the sample sentences to gain information about the meaning of the long form with OOVs.

To extract samples for each long form ι in D, Wikipedia® corpus is used. In some cases, this corpus can be replaced with any other large corpus such as Common Crawl. Any sentence in the introduction section of a Wikipedia® article that contains the long form ι is selected. Using this approach, the model creates a sample set $\hat{S}_\iota = \{S_1^1, S_2^1, \ldots, S_m^1\}$ for the long form ι. To represent the long form ι using its samples $\hat{S}_\iota$, first the model converts the sample sentence $S_i^1$ into a vector.

Word embedding component 615 is an example of, or includes aspects of, the corresponding element described with reference to FIG. 4. Word embeddings 620 are an example of, or include aspects of, the corresponding element described with reference to FIG. 4. According to an embodiment, a BERT encoder (i.e., word embedding component 615) is used to compute the vector representation $s_i^1$ for the sample sentence $S_i^1$.

Max pooling layer 625 is an example of, or includes aspects of, the corresponding element described with reference to FIG. 4. The output of the max pooling layer 625 is combined output 630. Combined output 630 is an example of, or includes aspects of, the corresponding element described with reference to FIG. 4. The vector $s_i^1$ is obtained via max pooling operation as follows:

$$s_{i,j}^l = \max_{w \in S_i^l} w_j \qquad (14)$$

where $s_{i,j}^1$ is the j-th element in the vector $s_i^1$ and $w_j$ is the j-th element in the BERT encoded vector if the word w in the sentence $s_i^1$.

Afterwards, the model computes a vector representation for the long form ι using the vectors $s_i^1$. However, as the vector $s_i^1$ is the representation of a sample sentence $S_i^1$, it might have some information which could be irrelevant to the meaning of the long form ι. To alleviate this issue, the model filters out the irrelevant information in $s_i^1$ using a feed-forward neural net. According to an embodiment, the combined output 630 is input to feed forward layer 635 to generate feed forward output 640. A filtered representation $\bar{s}_i^1$ is computed for the sample sentence $S_i^1$ as follows:

$$\bar{s}_i^1 = W_1 * (W_2 * s_i^1 + b_1) + b_2 \qquad (15)$$

where $W_1$ and $W_2$ are the weight matrix, and $b_1$ and $b_2$ are the biases that are optimized during training. In some cases, the filtered representation $\bar{s}_i^1$ is also referred to as the feed forward output 640.

According to an embodiment, the feed forward output 640 is input to the averaging component 645 to generate candidate long form representation 650. The model represents the long form θ by averaging the filtered representations $\bar{s}_i^1$ as follows:

$$1 = \frac{1}{\hat{S}_l} \sum_{s_i^l \in \hat{S}_l} \overline{s}_i^l \qquad (16)$$

where |·| represent the size of the set. The vector representation of the long-forms, l, is used in the scoring component.

Figure 7:
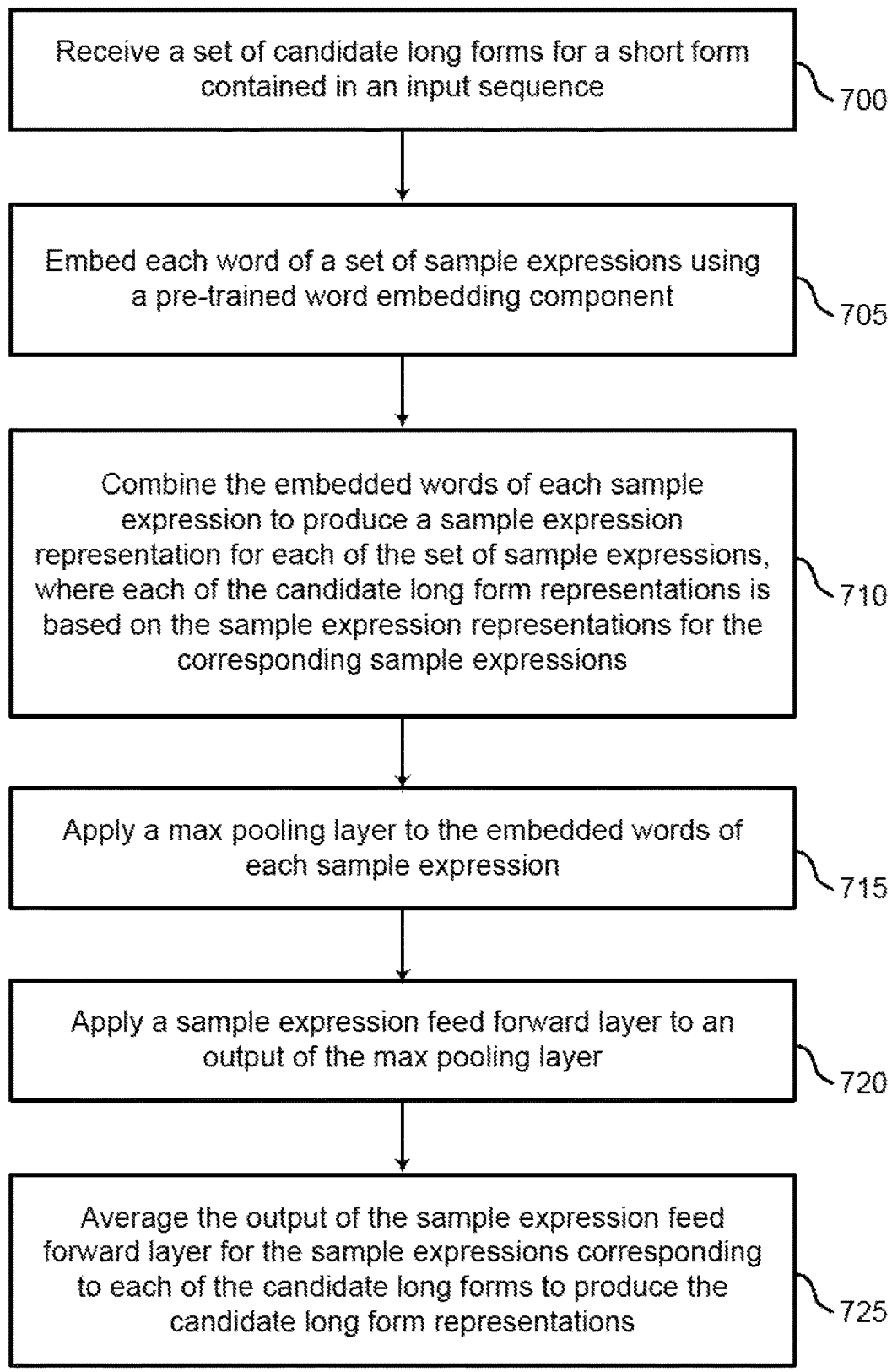
FIG. 7 shows an example of a process for long form encoding according to aspects of the present disclosure.

FIG. 7 shows an example of a process for long form encoding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives a set of candidate long forms for a short form contained in an input sequence. According to an example, the short form is "CNN". The set of candidate long forms at least include "Convolutional Neural Net" and "Cable News Network". According to some embodiments, the model includes an encoder-based zero-shot acronym definition network. The model represents the long forms of the acronyms using the samples which are easily accessible on the internet (one sample is one text in which one of the long forms of the acronym appears).

According to an embodiment, the long form encoder computes a vector representation for each possible long form from the set of candidate long forms. In another embodiment, the model computes a vector representation for each long form using the sentences extracted from the internet that contain the long form. In some cases, the operations of this step refer to, or may be performed by, a long form encoder as described with reference to FIG. 1.

At operation 705, the system embeds each word of a set of sample expressions using a pre-trained word embedding component. Each word of the set of sample expressions is input to a word embodiment component to generate word embeddings. According to an embodiment, a BERT encoder (i.e., word embedding component) is used to compute the vector representation for the sample sentence. In some cases, the operations of this step refer to, or may be performed by, a long form encoder as described with reference to FIG. 1.

At operation 710, the system combines the embedded words of each sample expression to produce a sample expression representation for each of the set of sample expressions, where each of the candidate long form representations is based on the sample expression representations for the corresponding sample expressions. In some cases, the operations of this step refer to, or may be performed by, a long form encoder as described with reference to FIG. 1.

At operation 715, the system applies a max pooling layer to the embedded words of each sample expression. According to an embodiment, word embeddings of each sample expression are input to the max pooling layer to generate combined output. In some cases, the operations of this step refer to, or may be performed by, a long form encoder as described with reference to FIG. 1.

At operation 720, the system applies a sample expression feed forward layer to an output of the max pooling layer. According to an embodiment, the model filters out the irrelevant information in the vector representation of the sample sentences (i.e., combine output) using a feed-forward neural net. In an embodiment, the combined output is input to feed forward layer to generate feed forward output. Therefore, a filtered representation is computed for the sample sentence. In some cases, the filtered representation is also referred to as the feed forward output. In some cases, the operations of this step refer to, or may be performed by, a long form encoder as described with reference to FIG. 1.

At operation 725, the system averages the output of the sample expression feed forward layer for the sample expressions corresponding to each of the candidate long forms to produce the candidate long form representations. According to an embodiment, the feed forward output is input to the averaging component to generate candidate long form representation. The model represents each candidate long form by averaging the filtered representations. In some cases, the operations of this step refer to, or may be performed by, a long form encoder as described with reference to FIG. 1.

Training

Figure 8:
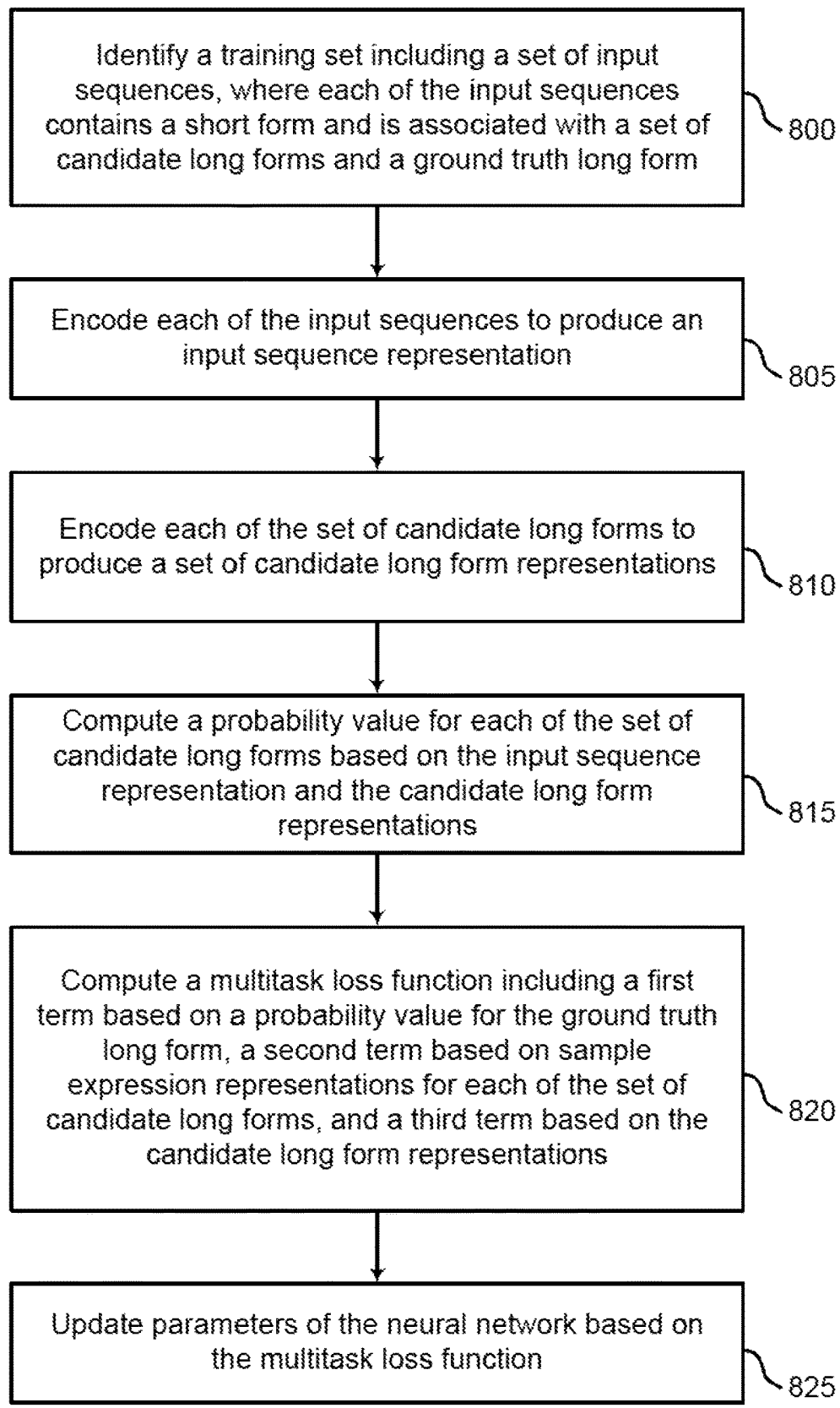
FIGS. 8, 9 and 10 show examples of a process for training a neural network for natural language processing according to aspects of the present disclosure.

FIG. 8 shows an example of a process for training a neural network for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies a training set including a set of input sequences, where each of the input sequences contains a short form and is associated with a set of candidate long forms and a ground truth long form. According to an example, one input sentence is "Models which use CNN need more data to be trained but they have better accuracy." A set of candidate long forms at least include "Convolutional Neural Net" and "Cable News Network". The ground truth long form for the short form "CNN" is "Convolutional Neural Net". In some cases, the operations of this step refer to, or may be performed by, a training component as described with reference to FIG. 1.

At operation 805, the system encodes each of the input sequences to produce an input sequence representation. According to some embodiments, the input sequence encoder is configured to encode each of the input sequences to produce a corresponding input sequence representation, where the input sequence includes a short form. In some examples, the input sequence encoder includes a word embedding component, an LSTM component, a max pooling layer, a concatenation function, and a feed forward layer. In some cases, the operations of this step refer to, or may be performed by, an input sequence encoder as described with reference to FIG. 1.

At operation 810, the system encodes each of the set of candidate long forms to produce a set of candidate long form representations. According to some embodiments, long form encoder encodes each of the set of candidate long forms to produce a set of candidate long form representations, where each of the candidate long form representations is based on a set of sample expressions and each of the sample expressions includes a candidate long form and contextual information.

According to some embodiments, the long form encoder embeds each word of the set of sample expressions using a pre-trained word embedding component (e.g., BERT encoder network). In some examples, the long form encoder combines the embedded words of each sample expression to produce a sample expression representation for each of the set of sample expressions, where each of the candidate long form representations is based on the sample expression representations for the corresponding sample expressions. The long form encoder applies a max pooling layer to the embedded words of each sample expression. The long form encoder applies a sample expression feed forward layer to an output of the max pooling layer. The long form encoder averages the output of the sample expression feed forward layer for the sample expressions corresponding to each of the candidate long forms to produce the candidate long form representations. In some cases, the operations of this step refer to, or may be performed by, a long form encoder as described with reference to FIG. 1.

At operation 815, the system computes a probability value for each of the set of candidate long forms based on the input sequence representation and the candidate long form representations. In some cases, the operations of this step refer to, or may be performed by, a scoring component as described with reference to FIG. 1.

At operation 820, the system computes a multitask loss function including a first term based on a probability value for the ground truth long form, a second term based on sample expression representations for each of the set of candidate long forms, and a third term based on the candidate long form representations.

As illustrated in FIG. 6, as the filtered representations $\bar{s}_i^1$ are supposed to represent only the meaning of the long form $\iota$ (excluding the other irrelevant information in sentence $S_i^1$), it is expected that the representations $s_i^1$ to be close to each other. To ensure this expectation is met during training, in a multi-task setting, the following loss function is added to the final loss function of the model:

$$\mathcal{L}_{closeness} = -\frac{1}{\sum_{l \in D} |\hat{S}_l|^2} \sum_{l \in D} \sum_{S_i^l \in \hat{S}_l} \sum_{S_j^l \in \hat{S}_l} \sigma(\bar{s}_i^l) \odot \sigma(\bar{s}_j^l) \quad (17)$$

where $|\cdot|$ represent the size of the set, $\sigma$ is the softmax function and is the Hadamard product. $\mathcal{L}_{closeness}$ is in the range of $[-1, 0]$ and during training it is closer to $-1$ (i.e., decreasing the distance between filtered sample representations of the same long form).

According to an embodiment, the model ensures that the computed vector representations of the long forms are distinct. One mechanism of the model encourages the distance between these vector representations, so it is not likely that two related meanings might have similar representations. To solve this potential issue, another auxiliary loss is added to the final loss function to encourage the representations of the long forms to be different from each other. The model adds the following loss function to the final model loss function:

$$\mathcal{L}_{distance} = -\frac{1}{|D|^2} \sum_{l \in D} \sum_{l' \in D} \sigma(l) \odot \sigma(l') \quad (18)$$

where $|\cdot|$ represents the size of the set, $\sigma$ is the softmax function, and $\odot$ is the hadamard product. $\mathcal{L}_{distance}$ is in the range of $[0, 1]$ and during training is closer to 0 (i.e., increasing the distance between the representations of the long forms).

Finally, to train the model, the system uses the following loss function:

$$\mathcal{L} = \alpha_1 * (-\log(P_i)) + \beta_1 * \mathcal{L}_{closeness} + \gamma_1 * \mathcal{L}_{distance} \quad (19)$$

where $P_i$ is the probability of the ground-truth long-form of the input sentence computed as $P_i = \sigma(s)_i$, where $\sigma$ is the softmax function, s is the overall score vector of size $|D|$, and $(\cdot)_i$ represents the i-th element of the vector. $\alpha_l$, $\beta_1$ and $\gamma_1$ are trade-off parameters to be fine-tuned using the performance on the development set.

In some cases, the operations of this step refer to, or may be performed by, a training component as described with reference to FIG. 1.

At operation 825, the system updates parameters of the neural network based on the multitask loss function. In some cases, the operations of this step refer to, or may be performed by, a training component as described with reference to FIG. 1.

Figure 9:
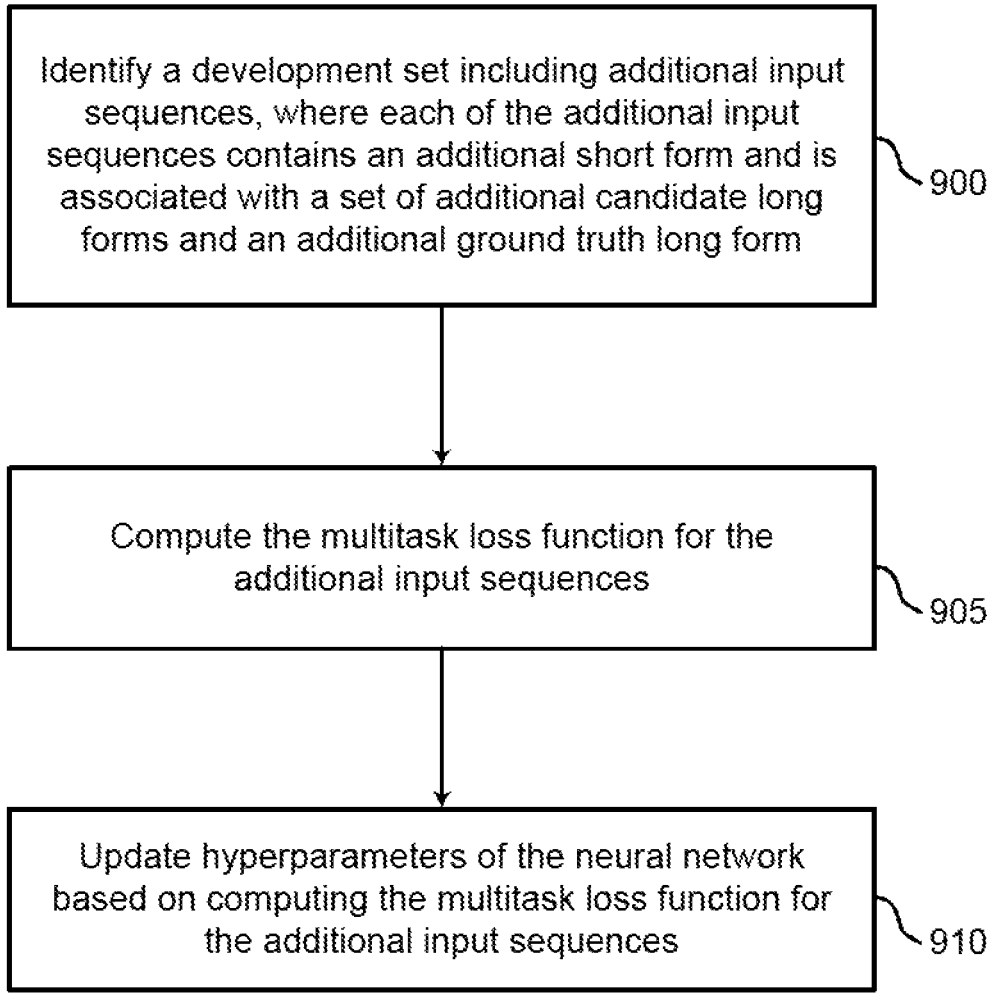

FIG. 9 shows an example of a process for training a neural network for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies a development set including additional input sequences, where each of the additional input sequences contains an additional short form and is associated with a set of additional candidate long forms and an additional ground truth long form. In some cases, the operations of this step refer to, or may be performed by, an input sequence encoder as described with reference to FIG. 1.

At operation 905, the system computes the multitask loss function for the additional input sequences. According to an embodiment, the multitask loss function includes a first term based on a probability value for the ground truth long form, a second term based on sample expression representations for each of the set of candidate long forms, and a third term based on the candidate long form representations. In some cases, the operations of this step refer to, or may be performed by, a training component as described with reference to FIG. 1.

At operation 910, the system updates hyperparameters of the neural network based on computing the multitask loss function for the additional input sequences. In some cases, the operations of this step refer to, or may be performed by, a training component as described with reference to FIG. 1.

Figure 10:
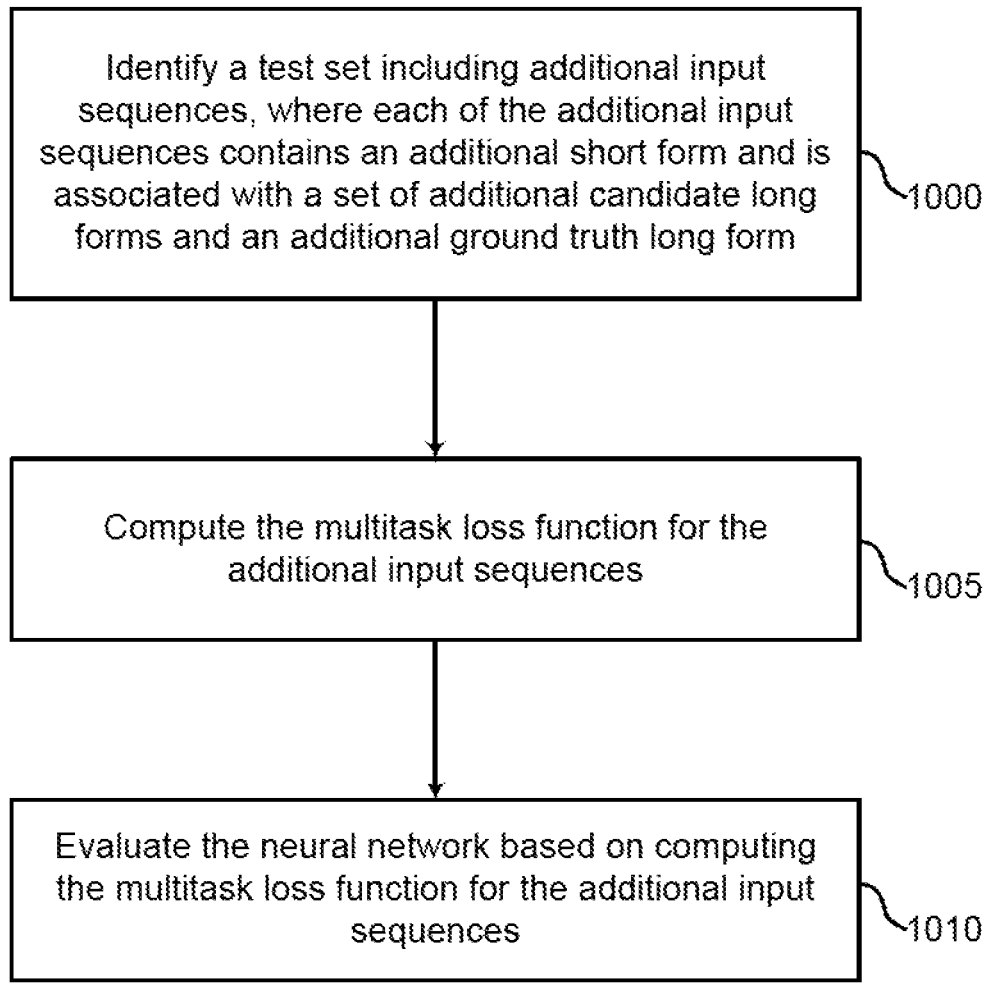

FIG. 10 shows an example of a process for training a neural network for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies a test set including additional input sequences, where each of the additional input sequences contains an additional short form and is associated with a set of additional candidate long forms and an additional ground truth long form. In some cases, the operations of this step refer to, or may be performed by, an input sequence encoder as described with reference to FIG. 1.

At operation 1005, the system computes the multitask loss function for the additional input sequences. According to an embodiment, the multitask loss function includes a first term based on a probability value for the ground truth long form, a second term based on sample expression representations for each of the set of candidate long forms, and a third term based on the candidate long form representations. In some cases, the operations of this step refer to, or may be performed by, a training component as described with reference to FIG. 1.

At operation 1010, the system evaluates the neural network based on computing the multitask loss function for the additional input sequences. In some cases, the operations of this step refer to, or may be performed by, a training component as described with reference to FIG. 1.

Evaluation

According to some cases, the acronym definition network is trained and evaluated using a public dataset. The public dataset contains sentences with ambiguous acronyms extracted from the Wikipedia®, the correct long form of the acronym in each sentence (i.e., ground truth long form), and a dictionary of possible long forms for each acronym. Since the model is designed for zero-shot setting, disjoint sets of acronyms are created for training, development and test sets. To evaluate the model, the model is compared with existing models, for example, NOA and BEM. The results are recorded showing that the model substantially increases accuracy in predicting the long form compared to the existing models.

Accordingly, the present disclosure includes at least the following embodiments.

A method for natural language processing is described. Embodiments of the method are configured to receive an input sequence and a plurality of candidate long forms for a short form contained in the input sequence, encode the input sequence to produce an input sequence representation, encode each of the plurality of candidate long forms to produce a plurality of candidate long form representations, wherein each of the candidate long form representations is based on a plurality of sample expressions and each of the sample expressions includes a candidate long form and contextual information, compute a plurality of similarity scores based on the candidate long form representations and the input sequence representation, and select a long form for the short form based on the plurality of similarity scores.

An apparatus for natural language processing is described. The apparatus includes a processor, memory in electronic communication with the processor, and instructions stored in the memory. The instructions are operable to cause the processor to receive an input sequence and a plurality of candidate long forms for a short form contained in the input sequence, encode the input sequence to produce an input sequence representation, encode each of the plurality of candidate long forms to produce a plurality of candidate long form representations, wherein each of the candidate long form representations is based on a plurality of sample expressions and each of the sample expressions includes a candidate long form and contextual information, compute a plurality of similarity scores based on the candidate long form representations and the input sequence representation, and select a long form for the short form based on the plurality of similarity scores.

A non-transitory computer readable medium storing code for natural language processing is described. In some examples, the code comprises instructions executable by a processor to: receive an input sequence and a plurality of candidate long forms for a short form contained in the input sequence, encode the input sequence to produce an input sequence representation, encode each of the plurality of candidate long forms to produce a plurality of candidate long form representations, wherein each of the candidate long form representations is based on a plurality of sample expressions and each of the sample expressions includes a candidate long form and contextual information, compute a plurality of similarity scores based on the candidate long form representations and the input sequence representation, and select a long form for the short form based on the plurality of similarity scores.

Some examples of the method, apparatus, and non-transitory computer readable medium described above further include embedding each word of the input sequence using a pre-trained word embedding component. Some examples further include combining the embedded words of the input sequence, wherein the input sequence representation is based on the combination.

Some examples of the method, apparatus, and non-transitory computer readable medium described above further include encoding a context of the input sequence by applying a long short-term memory (LSTM) component to the embedded words of the input sequence. Some examples further include applying a max pooling layer to an output of the LSTM component.

Some examples of the method, apparatus, and non-transitory computer readable medium described above further include concatenating the combined embedded words of the input sequence with an embedding of the short form to produce the input sequence representation.

Some examples of the method, apparatus, and non-transitory computer readable medium described above further include embedding each word of the plurality of sample expressions using a pre-trained word embedding component. Some examples further include combining the embedded words of each sample expression to produce a sample expression representation for each of the plurality of sample expressions, wherein each of the candidate long form representations is based on the sample expression representations for the corresponding sample expressions.

Some examples of the method, apparatus, and non-transitory computer readable medium described above further include applying a max pooling layer to the embedded words of each sample expression. Some examples further include applying a sample expression feed forward layer to an output of the max pooling layer. Some examples further include averaging the output of the sample expression feed forward layer for the sample expressions corresponding to each of the candidate long forms to produce the candidate long form representations.

Some examples of the method, apparatus, and non-transitory computer readable medium of computing the plurality of similarity scores described above further include generating a first cosine similarity based on an intermediate input sequence representation and an intermediate long form representation for each of the candidate long forms. Some examples further include generating a second cosine similarity between the input sequence representation and the intermediate long form representation for each of the candidate long forms. Some examples further include generating a third cosine similarity between the input sequence representation and the candidate long form representation for each of the candidate long forms. Some examples further include computing a weighted sum of the first cosine similarity, the second cosine similarity and the third cosine similarity for each of the candidate long forms, wherein the long form for the short form is selected based on the weighted sum.

Some examples of the method, apparatus, and non-transitory computer readable medium described above further include extracting the sample expressions from an online source.

In some examples, the short form was not used for training an input sequence encoder or a long form encoder.

A method of training a neural network for natural language processing is described. Embodiments of the method are configured to identify a training set comprising a plurality of input sequences, wherein each of the input sequences contains a short form and is associated with a plurality of candidate long forms and a ground truth long form, encode each of the input sequences to produce an input sequence representation, encode each of the plurality of candidate long forms to produce a plurality of candidate long form representations, compute a probability value for each of the plurality of candidate long forms based on the input sequence representation and the candidate long form representations, compute a multitask loss function including a first term based on a probability value for the ground truth long form, a second term based on sample expression representations for each of the plurality of candidate long forms, and a third term based on the candidate long form representations, and update parameters of the neural network based on the multitask loss function.

An apparatus of training a neural network for natural language processing is described. The apparatus includes a processor, memory in electronic communication with the processor, and instructions stored in the memory. The instructions are operable to cause the processor to identify a training set comprising a plurality of input sequences, wherein each of the input sequences contains a short form and is associated with a plurality of candidate long forms and a ground truth long form, encode each of the input sequences to produce an input sequence representation, encode each of the plurality of candidate long forms to produce a plurality of candidate long form representations, compute a probability value for each of the plurality of candidate long forms based on the input sequence representation and the candidate long form representations, compute a multitask loss function including a first term based on a probability value for the ground truth long form, a second term based on sample expression representations for each of the plurality of candidate long forms, and a third term based on the candidate long form representations, and update parameters of the neural network based on the multitask loss function.

A non-transitory computer readable medium storing code for training a neural network for natural language processing is described. In some examples, the code comprises instructions executable by a processor to: identify a training set comprising a plurality of input sequences, wherein each of the input sequences contains a short form and is associated with a plurality of candidate long forms and a ground truth long form, encode each of the input sequences to produce an input sequence representation, encode each of the plurality of candidate long forms to produce a plurality of candidate long form representations, compute a probability value for each of the plurality of candidate long forms based on the input sequence representation and the candidate long form representations, compute a multitask loss function including a first term based on a probability value for the ground truth long form, a second term based on sample expression representations for each of the plurality of candidate long forms, and a third term based on the candidate long form representations, and update parameters of the neural network based on the multitask loss function.

In some examples, the first term represents a first training task of predicting a correct long form for the short form.

In some examples, the second term represents a second training task of ensuring that the sample expression representations for a candidate long form are sufficiently similar.

In some examples, the third term represents a third training task of ensuring that the candidate long form representations for different candidate long forms are sufficiently different.

Some examples of the method, apparatus, and non-transitory computer readable medium described above further include identifying a development set comprising additional input sequences, wherein each of the additional input sequences contains an additional short form and is associated with a plurality of additional candidate long forms and an additional ground truth long form. Some examples further include computing the multitask loss function for the additional input sequences. Some examples further include updating hyperparameters of the neural network based on computing the multitask loss function for the additional input sequences.

Some examples of the method, apparatus, and non-transitory computer readable medium described above further include identifying a test set comprising additional input sequences, wherein each of the additional input sequences contains an additional short form and is associated with a plurality of additional candidate long forms and an additional ground truth long form. Some examples further include computing the multitask loss function for the additional input sequences. Some examples further include evaluating the neural network based on computing the multitask loss function for the additional input sequences.

In some examples, the neural network comprises an input sequence encoder for encoding the input sequences and a long form encoder for encoding the plurality of candidate long forms.

An apparatus for natural language processing is described. Embodiments of the apparatus include an input sequence encoder configured to encode an input sequence to produce an input sequence representation, wherein the input sequence includes a short form, a long form encoder configured to encode each of a plurality of candidate long forms for the short form to produce a plurality of candidate long form representations, wherein each of the candidate long form representations is encoded based on a plurality of sample expressions that include a corresponding candidate long form, and a long form selection component configured to select a long form for the short form by comparing each of the candidate long form representations to the input sequence representation.

A method of providing an apparatus for natural language processing is described. The method includes providing an input sequence encoder configured to encode an input sequence to produce an input sequence representation, wherein the input sequence includes a short form, a long form encoder configured to encode each of a plurality of candidate long forms for the short form to produce a plurality of candidate long form representations, wherein each of the candidate long form representations is encoded based on a plurality of sample expressions that include a corresponding candidate long form, and a long form selection component configured to select a long form for the short form by comparing each of the candidate long form representations to the input sequence representation.

In some examples, the input sequence encoder comprises a word embedding component, an LSTM component, a max pooling layer, a concatenation function, and a feed forward layer.

In some examples, the long form encoder comprises a word embedding component, a max pooling layer, a feed forward layer, and an averaging function.

In some examples, the word embedding component comprises a pre-trained BERT model.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one".

What is claimed is:

1. A method for natural language processing, comprising:
receiving a prompt comprising an input sequence including a short form;
encoding a plurality of words from the input sequence to obtain a first representation vector by computing a plurality of word embeddings corresponding to the plurality of words, respectively, and generating the first representation vector based on the plurality of word embeddings;
encoding the short form to obtain a second representation vector;
generating an input sequence representation based on the first representation vector and the second representation vector using a neural network that is trained based on ground-truth long form data;
encoding each of a plurality of candidate long forms to produce a plurality of candidate long form representations, wherein each of the candidate long form representations is based on a plurality of sample expressions and each of the sample expressions includes a candidate long form and contextual information;
computing a plurality of similarity scores for each of the candidate long forms based on the plurality of candidate long form representations, respectively, wherein the plurality of similarity scores include a first similarity score and a second similarity score, wherein the first similarity score is based on the plurality of word embeddings and at least one of the candidate long form representations, and wherein the second similarity score is based on the input sequence representation and the at least one of the candidate long form representations;
computing a weighted sum of the first similarity score and the second similarity score; and
generating a response to the prompt including a long form corresponding to the short form based on the weighted sum.

2. The method of claim 1, further comprising:
embedding each word of the input sequence using a pre-trained word embedding component; and
combining the embedded words of the input sequence, wherein the input sequence representation is based on the combination.

3. The method of claim 2, further comprising:
encoding a context of the input sequence by applying a long short-term memory (LSTM) component to the embedded words of the input sequence; and
applying a max pooling layer to an output of the LSTM component.

4. The method of claim 2, further comprising:
concatenating the combined embedded words of the input sequence with an embedding of the short form to produce the input sequence representation.

5. The method of claim 1, further comprising:
embedding each word of the plurality of sample expressions using a pre-trained word embedding component; and
combining the embedded words of each sample expression to produce a sample expression representation for each of the plurality of sample expressions, wherein each of the candidate long form representations is based on the sample expression representations for the corresponding sample expressions.

6. The method of claim 5, further comprising:
applying a max pooling layer to the embedded words of each sample expression;
applying a sample expression feed forward layer to an output of the max pooling layer; and
averaging the output of the sample expression feed forward layer for the sample expressions corresponding to each of the candidate long forms to produce the candidate long form representations.

7. The method of claim 1, wherein computing the plurality of similarity scores further comprises:
generating the first similarity score by computing a first cosine similarity based on an intermediate input sequence representation and an intermediate long form representation for each of the candidate long forms, wherein the intermediate input sequence representation is based on the plurality of word embeddings;
generating the second similarity score by computing a second cosine similarity between the input sequence representation and the intermediate long form representation for each of the candidate long forms; and
generating a third similarity score by computing a third cosine similarity between the input sequence representation and a filtered candidate long form representation for each of the candidate long forms,
wherein the weighted sum is based on the first cosine similarity, the second cosine similarity and the third cosine similarity for each of the candidate long forms, and wherein the long form for the short form is selected based on the weighted sum.

8. The method of claim 1, further comprising:
extracting the sample expressions from an online source.

9. The method of claim 1, wherein:
the short form was not used for training an input sequence encoder or a long form encoder.

10. An apparatus for natural language processing, comprising:
an input sequence encoder configured to encode a plurality of words from a prompt comprising an input sequence including a short form to obtain a first representation vector by computing a plurality of word embeddings corresponding to the plurality of words, respectively, and generating the first representation vector based on the plurality of word embeddings, and to encode the short form to obtain a second representation vector, wherein an input sequence representation is generated based on the first representation vector and the second representation vector using a neural network that is trained based on ground-truth long form data;
a long form encoder configured to encode each of a plurality of candidate long forms for the short form to produce a plurality of candidate long form representations, wherein each of the candidate long form representations is encoded based on a plurality of sample expressions that include a corresponding candidate long form;
a scoring component configured to compute a plurality of similarity scores for each of the candidate long forms based on the plurality of candidate long form representations, respectively, wherein the plurality of similarity scores include a first similarity score and a second similarity score, wherein the first similarity score is based on the plurality of word embeddings and at least one of the candidate long form representations, and wherein the second similarity score is based on the input sequence representation and the at least one of the candidate long form representations, and to compute a weighted sum of the first similarity score and the second similarity score; and
a long form selection component configured to generate a response to the prompt including a long form corresponding to the short form based on the weighted sum.

11. The apparatus of claim 10, wherein:
the input sequence encoder comprises a word embedding component, a long short-term memory (LSTM) component, a max pooling layer, a concatenation function, and a feed forward layer.

12. The apparatus of claim 10, wherein:
the long form encoder comprises a word embedding component, a max pooling layer, a feed forward layer, and an averaging function.

13. The apparatus of claim 12, wherein:
the word embedding component comprises a pre-trained BERT model.

* * * * *